(12) United States Patent
Kidd et al.

(10) Patent No.: US 8,038,232 B2
(45) Date of Patent: Oct. 18, 2011

(54) PNEUMATIC BRAKE SYSTEM WITH SAFE DRAINAGE CIRCUIT AND METHOD OF OPERATING THE SAME

(76) Inventors: John W. Kidd, Pittsford, NY (US); Thomas D. Gorsky, Macedon, NY (US); Jeffrey C. Smith, Canandaigua, NY (US)

( * ) Notice: Subject to any disclaimer, the term of this patent is extended or adjusted under 35 U.S.C. 154(b) by 0 days.

(21) Appl. No.: 12/803,977

(22) Filed: Jul. 12, 2010

(65) Prior Publication Data

US 2011/0005875 A1 Jan. 13, 2011

Related U.S. Application Data

(60) Provisional application No. 61/270,659, filed on Jul. 10, 2009.

(51) Int. Cl.
*B60T 13/68* (2006.01)
(52) U.S. Cl. ............................................ 303/127; 303/3
(58) Field of Classification Search .................. 303/3, 7, 303/13, 15, 122.15, 127, 128
See application file for complete search history.

(56) References Cited

U.S. PATENT DOCUMENTS

| | | | | |
|---|---|---|---|---|
| 6,752,472 B2 * | 6/2004 | Bezzina | | 303/7 |
| 7,784,879 B2 * | 8/2010 | Koelzer | | 303/3 |
| 2005/0116533 A1 * | 6/2005 | Herges et al. | | 303/3 |
| 2006/0232125 A1 * | 10/2006 | Thomas | | 303/7 |

\* cited by examiner

*Primary Examiner* — Christopher Schwartz
(74) *Attorney, Agent, or Firm* — Timothy M. Schaeberle

(57) ABSTRACT

A pneumatic brake system for a motor vehicle includes a compressed air system including a plurality of compressed air reservoirs containing compressed air. A service brake system in fluid communication with the compressed air system is operably engaged by application of the compressed air from the compressed air system. A parking brake system in fluid communication with the compressed air system is operably engaged upon the engagement of a spring brake component. A compressed air release system is coupled to the compressed air system and the parking brake system. The compressed air release system is configured to receive a command and in response to the command drain compressed air from the compressed air system if the parking brake system is engaged.

15 Claims, 2 Drawing Sheets

PNEUMATIC BRAKE SYSTEM WITH SAFE DRAINAGE CIRCUIT AND METHOD OF OPERATING THE SAME

TECHNOLOGICAL FIELD

The invention relates to an air release system for a pneumatic brake system and, in particular, to a pressurized air release system operably engaged to the parking or safety brake and capable of functioning only when parking or safety brake is engaged and which functions for periodically purging the pressurized air from the pneumatic system.

BACKGROUND

Pneumatic brake systems which use pressurized air to operate the service brakes and also to release the parking or safety brakes, are well known in the art. The pressurized air (so-called "supply pressure") is stored in a reservoir that is charged by a compressor through a series of check valves and/or a pressure protection valve. In these pneumatic brake systems, the driver's brake pedal or other controls directs the flow of so-called "control air." The brake pedal, when applied, opens the reservoir air supply and sends control air, which generates control air pressure, to a relay valve. The relay valve, in response to the control air pressure, connects the reservoir air supply to the brake actuators, which applies mechanical force to the brakes.

In these braking systems, the pressure generated by the driver's foot on the pedal is not applied directly to the brakes; rather, it is used to deliver air pressure from the reservoir to the brake actuators, which then apply mechanical force to the brakes. While the vehicle is in use, the supply air pressure remains at a high level. It may fluctuate somewhat, but it generally remains above 90 psig (pounds per square inch, gauge). When the mechanical parking brakes of the vehicle are needed and the pneumatic brakes are no longer needed, the brake system is normally de-pressurized and the supply line air pressure drops to zero psig (or atmospheric pressure), thus resulting in automatic application of the vehicle parking brakes and, as a result, the application of the spring brake component.

This depressurization step is typically accomplished on school buses and commercial vehicles by "pumping down" the brakes to relieve the pressure below a certain preset value. This procedure is done both when starting up the vehicle as a test to determine if the brake system's compressed air system is functioning properly (i.e., no leaks) and also to ascertain whether the parking brake is functioning properly (as it engages below a certain psig as a result of the application of the spring brake component). Additionally, many states, for safety reasons, require that any time a driver leaves a commercial vehicle, most particularly school buses, the parking brake must be engaged by pumping down the brakes rather than simply mechanically engaging the parking brake; this safety requirement is required by states due to the fact that a mechanically engaged parking brake can be disengaged given that air pressure is still present in the overall braking system, whereas one which has been engaged by a reduction in compressed air below a certain level cannot, as it follows that there is no air pressure left in the system to release the spring brake component.

One potential harmful effect of this "pumping down" of air brakes procedure is that unwanted oil and moisture can be distributed throughout the entire air system, causing premature failure of the air valves. Additionally, the strong mechanical force associated with the pumping of brakes down to release or reduce the compressed air can also contribute to premature brake component failure.

Referring now to FIG. 1, disclosed therein is a schematic diagram of a standard prior art air brake system 100. The system 100 includes a compressed air system source 111 and a compressed air system 110 in communication with the compressed air system source 111. The compressed air system 110 is comprised of a supply (or wet) reservoir 112 in fluid communication with a front (secondary) service reservoir 114 and a rear (or primary) service reservoir 116. The front service reservoir 114 is in fluid communication with a brake valve 118a for engaging the front brake 120 upon the application of compressed air, while the rear service reservoir 116 is in fluid communication with brake valve 118b for engaging the rear brake 122 upon the application of compressed air. Additionally, the front service reservoir 114 is in fluid communication with the park control lever 124 and spring (or parking) brake control valve 126 for engaging the spring brake component 128 of the parking brake; this parking brake is applied when the driver actuates the park control lever 124/spring brake control valve 126 or when the compressed air pressure falls below a preset psi (e.g. 60 psi). As previously described, "pumping down" the brakes to engage this parking brake by reducing the air pressure below this predetermined pressure level results in a number of problems such as unnecessary wear and tear on the brake system and potentially premature brake system failure as well as an unsafe condition whereby the spring brake component/parking break is capable of being released due to residual compressed air in the system.

As such, what is desired is an air drain system which is capable of safely draining the air tanks, as well as draining or removing harmful moisture and oil from the air lines, and which is capable of safely engaging the parking brake system which results in safely securing school buses and other commercial vehicles exhibiting air brakes. Furthermore, an air drain system is desired which allows securing of commercial vehicles without damaging the entire braking system and which is designed to prevent wear and tear on air valves and mechanical parts which is typically exhibited by those brake systems requiring "pumping down" of the brakes.

SUMMARY

The present invention relates to brake system assembly which includes compressed air release system which is capable of safely draining the compressed air from a brake system without causing premature damage to either the air valves or the brake components and thus avoiding premature brake failure.

In a first aspect of the present invention, a pneumatic brake system for a motor vehicle comprises a compressed air system including a plurality of compressed air reservoirs. The pneumatic brake system further includes a service brake system in fluid communication with the compressed air system and operably engaged by application of compressed air from the compressed air system. The pneumatic brake system further includes a parking brake system in fluid communication with the compressed air system. The parking brake system is operably engaged upon the engagement of a spring brake component. The pneumatic brake system further includes a compressed air release system coupled to the compressed air system and the parking brake system. The compressed air release system is configured to receive a command and in response to the command drain compressed air from the compressed air system only if the parking brake system is engaged.

In a second aspect of the present invention, a method of operating a pneumatic brake system including a parking brake system and a service brake system in fluid communication with a compressed air system, comprises providing a command, upon the full engagement of the parking brake system, to a compressed air release system which is coupled to the parking brake system and the compressed air system, resulting in the draining of compressed air from the compressed air release system.

Other features and advantages of the invention will be apparent from the following description and the appended claims.

BRIEF DESCRIPTION OF THE DRAWINGS

The accompanying drawings, described below, illustrate typical embodiments of the invention and are not to be considered limiting of the scope of the invention, for the invention may admit to other equally effective embodiments. The figures are not necessarily to scale, and certain features and certain view of the figures may be shown exaggerated in scale or in schematic in the interest of clarity and conciseness.

DETAILED DESCRIPTION

Figure 1:
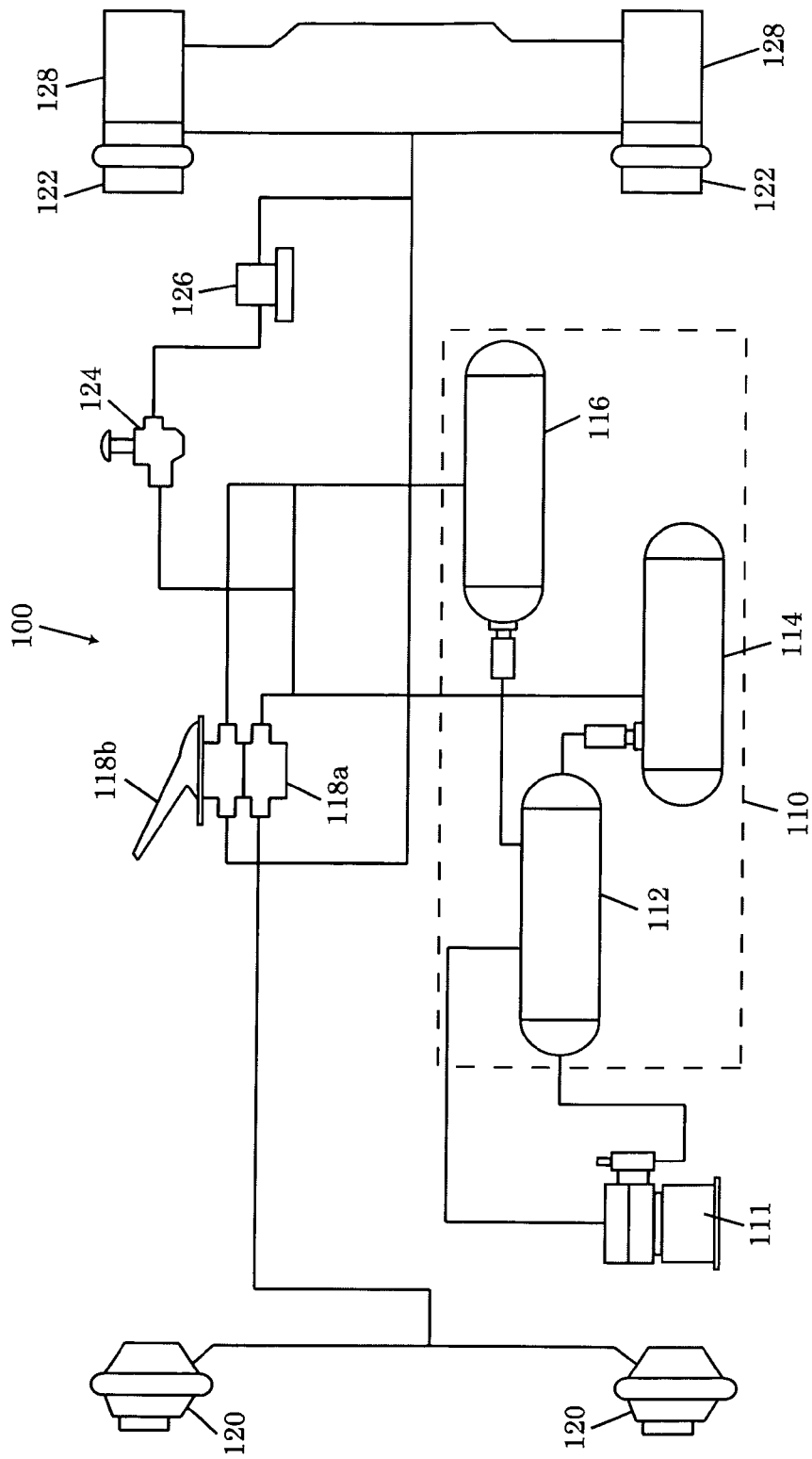
FIG. 1 is a schematic diagram of a standard prior art air brake system.

The invention will now be described in detail with reference to a few preferred embodiments, as illustrated in the accompanying drawings. In describing the preferred embodiments, numerous specific details are set forth in order to provide a thorough understanding of the invention. However, it will be apparent to one skilled in the art that the invention may be practiced without some or all of these specific details. In other instances, well-known features and/or process steps have not been described in detail so as not to unnecessarily obscure the invention. In addition, like or identical reference numerals are used to identify common or similar elements.

The present invention can be understood more readily by reference to the following detailed description, examples, and claims, and their previous and following description. However, before the present articles and/or methods are disclosed and described, it is to be understood that this invention is not limited to the specific articles and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Figure 2:
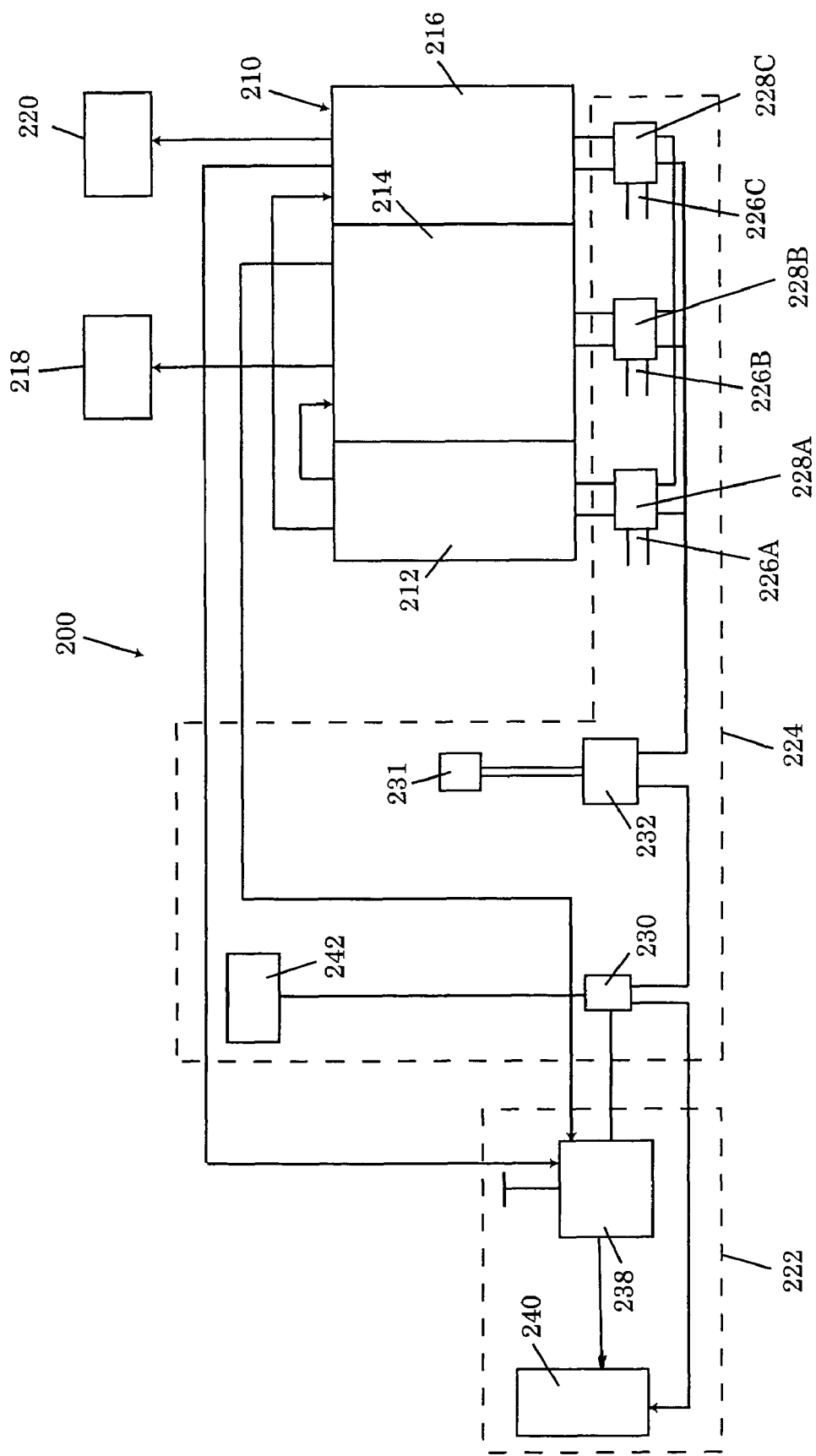
FIG. 2 is a schematic diagram of brake system including the compressed air release system.

Referring now to FIG. 2, illustrated therein is a schematic diagram of brake system 200 including the compressed air release system which overcomes the aforementioned shortcomings of the prior art brake systems. This novel brake system 200 is comprised of a compressed air system 210, which is comprised of a supply (or wet) reservoir 212 in fluid communication with a front (secondary) service reservoir 214 and rear (or primary) service reservoir 216. The supply reservoir 212 receives compressed air from a compressed air source (not shown). A service brake system comprising front and rear service brake systems 218 and 220, respectively, are in fluid communication with the compressed air system 210, specifically the front (secondary) service reservoir 214 and rear (or primary) service reservoir 216, respectively. Each of these front and rear brakes are operably engaged by the application of compressed air from the compressed air system 210 and involve the use of a series of control valves known to those skilled in the art.

The novel brake system also comprises a parking brake system 222 in fluid communication with the compressed air system 210 which comprises a parking brake valve 238, in fluid communication with a spring brake component 240. The parking brake system 222 may be operably engaged either manually or automatically, however the spring brake system 222 becomes engaged upon the engagement or extension of the spring brake component 240. Specifically, the rear (or primary) service reservoir 216 and the front (secondary) service reservoir 214 are separately in communication with the parking brake system 222. As an alternative to the prior braking systems where the "pumping down" of the brakes (or alternatively, manually draining the compressed air system reservoirs) so as to reduce the air pressure level below a certain preset level, is necessary to maintain or ensure the continued engagement of the parking brake system (spring brake engagement/extension), the novel brake system includes a compressed air release system 224 which functions to do the same. This compressed air release system 224 is coupled to the parking brake system 222 and the compressed air system 210 and operates to drain compressed air from the compressed air system 210. More specifically, the compressed air release system 224 is configured to receive a command (only upon the engaged state of the parking brake system 222/spring brake component 240) and in response to the command drain compressed air from the compressed air system 210.

The compressed air release system 224 comprises a series of normally closed solenoid drain valves 228A, 228B, and 228C having main exhaust ports 226A, 226B, and 226C, respectively, which are capable of being electrically activated and opened to the atmosphere, thus resulting in the release of compressed air from the compressed air system 210 to the atmosphere. That is, compressed air is released from the supply (or wet) reservoir 212, the front (or secondary) service reservoir 214, and the rear (or primary) service reservoir 216. The compressed air release system 224 further comprises an electrical source 242, a normally closed pressure switch 230 electrically coupled to a normally open contact switch 232, which is electrically coupled to the series of normally closed solenoid drain valve 228A, 228B, 228C; the normally open contact switch 232 being configured to be closed in response to a command, which functions to thereby complete an electrical circuit. In one embodiment, the electrical source 242 can simply be a 12 Volt electrical source that can be controlled by ignition switch and sourced from a standard 12 Volt battery. However, the present invention is not limited to only a 12 Volt electrical source. Any suitable source of electrical power may be used. The normally closed pressure switch 230 is closed when no air pressure is applied to it. In other words, the normally closed pressure switch 230 achieves its normally closed state when pressure is removed, e.g., as a result of the parking brake system 222 being engaged. The parking brake system 222 is engaged upon the release of air pressure to the spring brake component 240 which causes the spring brake component to engage or extend into position. This is achieved by actuating the parking brake valve 238, which releases the air pressure to fully extend the spring brake component 240.

The compressed air release system 224 functions as follows: once the parking brake system 222 is manually and fully engaged, and thus the spring brake component 240 is fully engaged, the normally closed pressure switch 230 closes. Thereafter, the normally open contact switch 232 is closed, thus completing the electrical circuit between the electrical source 242 and the normally closed solenoid drain valves 228A, 228B, 228C, which enables the normally closed solenoid drain valves 228A, 228B, 228C to be energized by electrical power from the electrical source 242. In short, the closing of the normally open contact switch (only when the parking brake system is engaged), which completes the electrical circuit between the electrical source, the normally closed pressure switch 230 and the normally open contact switch 232 and the solenoid valves, is that initial command which enables solenoid valves to be energized and results in the safe drainage of any remaining compressed air from the compressed air system 210. It should be reiterated and emphasized that completion of the electrical circuit in response to a command can only be achieved upon the engagement of the parking brake system 222, due to the fact that the circuit can only be complete when the normally closed pressure switch 230 is closed upon parking system 222 engagement, regardless of whether the normally open contact switch 232 is closed.

In one embodiment, the pneumatic brake system 200 comprises an input mechanism for providing the command to the compressed air release system 210, the input mechanism being coupled to and capable of closing the normally open contact switch 232. One input mechanism contemplated comprises manually closing the normally open contact switch 232 via the use of a push button 231 coupled to the normally open contact switch; other options include use of a lever to close the normally open contact switch 232. When the series of normally closed solenoid valves 228A, 228B, 228C are activated to their open positions, they allow the compressed air from the reservoirs of the compressed air system 210 to drain out via the respective exhaust ports 226A, 226B, 226C.

In one embodiment the solenoid drain valves 228A, 228B, 228C exhibit a ¼"male national pipe thread and include a cleanable screen on the inlet of the valve to keep dirt, rust and other contaminants out of the valve. Solenoid valves can additionally include a manual drain exhaust port upstream from the aforementioned main exhaust ports; these additional exhaust ports are utilized for testing and servicing the brake system. Typically, solenoid drain valves exhibit a 4 mm orifice for primary and secondary tanks and a 6 mm orifice for wet tank, to drain faster and help eliminate the transfer of oil, water and debris from the wet to the secondary and primary tanks. Orifice size can be adjusted for desired rate of draining. A heater can be installed to prevent valves from freezing in cold climates, similar to those used in existing automatic drains.

In its simplest embodiment the method of operating a pneumatic brake system including a parking brake system and a service brake system in fluid communication with a compressed air system, comprises first providing a command, upon the full engagement of the parking brake system, to a compressed air release system which is coupled to the parking brake system and the compressed air system, resulting in the draining of compressed air from the compressed air release system.

As previously described, the advantages of this air release system are the compressed air can be released from compressed air source (supply, rear and front) without the undesirable and detrimental "pumping down" of the brakes, thus avoiding unnecessary wear and tear on the brake components and premature brake failure and any moisture in the compressed air source (supply, rear and front) will be drained at the same time. Also as stated previously, one unique feature of this system is that that once the air pressure is reduced below the preset value there is no risk in releasing the spring brake component of the parking brake system. An additional unique feature of this compressed air release system 224 is that it is capable of functioning only when the parking brake has been manually and fully engaged.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A pneumatic brake system for a motor vehicle, comprising:
 a compressed air system including a plurality of compressed air reservoirs;
 a service brake system in fluid communication with the compressed air system and operably engaged by application of compressed air from the compressed air system;
 a parking brake system in fluid communication with the compressed air system, the parking brake system being operably engaged upon the engagement of the spring brake component; and
 a compressed air release system coupled to the compressed air system and the parking brake system, the compressed air release system being configured to receive a command and in response to the command drain compressed air from at least one of the compressed air reservoirs if the parking brake system is engaged.

2. The pneumatic brake system of claim 1, wherein the compressed air release system comprises at least one normally closed solenoid valve having an exhaust port, the at least one normally closed solenoid valve being in fluid communication with at least one of the compressed air reservoirs and configured to drain compressed air from the at least one of the compressed air reservoirs when activated to an open position.

3. The pneumatic brake system of claim 2, wherein the compressed air release system further comprises an electrical circuit for activating the at least one normally closed solenoid valve to the open position.

4. The pneumatic brake system of claim 3, wherein the electrical circuit is completed in response to the command.

5. The pneumatic brake system of claim 4, wherein the electrical circuit comprises a normally closed pressure switch that closes when the parking brake is engaged.

6. The pneumatic brake system of claim 5, wherein the electrical circuit further comprises a normally open contact switch that is electrical coupled to the normally closed pressure switch, the normally open contact switch being configured to be closed in the response to the command, thereby completing the electrical circuit.

7. The pneumatic brake system of claim 6, wherein the electrical circuit further comprises an electrical power source coupled to the normally closed pressure switch.

8. The pneumatic brake system of claim 6, further comprising an input mechanism for providing the command to the compressed air release system, the input mechanism being coupled to the normally open contact switch.

9. A method of operating a pneumatic brake system including a parking brake system and a service brake system in fluid communication with a compressed air system including a plurality of compressed air reservoirs, comprising:
- receiving a command at a compressed air release system coupled to the parking brake system and the compressed air system; and
- draining compressed air from at least one of the compressed air reservoirs in response to the command if the parking brake system is engaged.

10. The method of claim 9, wherein draining the compressed air comprises activating at least one normally closed solenoid drain valve in fluid communication with the at least one of the reservoirs to an open position.

11. The method of claim 10, wherein draining the compressed air further comprises completing an electrical circuit that activates the normally closed solenoid drain valve to the open position.

12. The method of claim 11, wherein completing the electrical circuit comprises closing a normally closed pressure switch.

13. The method of claim 12, wherein closing the normally closed pressure switch occurs as a result of the pressure brake system being engaged.

14. The method of claim 13, wherein completing the electrical circuit further comprises closing a normally open contact switch electrically coupled to the normally closed pressure switch.

15. The method of claim 14, wherein closing the normally open contact switch occurs in response to the command.

* * * * *